US012249777B2

(12) United States Patent
Wu

(10) Patent No.: US 12,249,777 B2
(45) Date of Patent: Mar. 11, 2025

(54) ULTRA-WIDEBAND ANTENNA DEVICE

(71) Applicant: ASUSTeK COMPUTER INC., Taipei (TW)

(72) Inventor: Yu-Ching Wu, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 201 days.

(21) Appl. No.: 18/181,839

(22) Filed: Mar. 10, 2023

(65) Prior Publication Data

US 2024/0039164 A1 Feb. 1, 2024

(30) Foreign Application Priority Data

Jul. 27, 2022 (TW) ................................. 111128216

(51) Int. Cl.

*H01Q 5/25* (2015.01)
*H01Q 5/364* (2015.01)
*H01Q 9/04* (2006.01)

(52) U.S. Cl.

CPC ............. *H01Q 9/0421* (2013.01); *H01Q 5/25* (2015.01); *H01Q 5/364* (2015.01)

(58) Field of Classification Search

CPC ...... H01Q 1/38; H01Q 9/0407; H01Q 9/0421; H01Q 5/25

See application file for complete search history.

(56) References Cited

U.S. PATENT DOCUMENTS

2018/0029457 A1 10/2018 Bjorn
2023/0178901 A1* 6/2023 Kim ....................... H01Q 21/24 343/702
2023/0361483 A1* 11/2023 Yun ........................ H01Q 21/28
2024/0106125 A1* 3/2024 Kwon ................. H01Q 9/0428

FOREIGN PATENT DOCUMENTS

CN 207883895 U 9/2018
CN 112736471 A 4/2021
CN 112821064 A 5/2021
TW 201019534 A1 5/2010
TW I679809 B 12/2019
TW 202042440 A 11/2020

* cited by examiner

*Primary Examiner* — Daniel Munoz

(74) *Attorney, Agent, or Firm* — McClure, Qualey & Rodack, LLP

(57) ABSTRACT

An ultra-wideband antenna device includes a radiation metal body, a first slotted hole, a second slotted hole, a third slotted hole, a fourth slotted hole, a ground point, and a feeding source. The radiation metal body includes a first side edge and a second side edge opposite to each other and a third side edge and a fourth side edge opposite to each other, the first slotted hole extends inward from the first side edge, the second slotted hole extends inward from the second side edge, the third slotted hole extends inward from the third side edge, and the fourth slotted hole extends inward from the fourth side edge. The ground point is located at a middle position of the radiation metal body, and the feeding source is located on the radiation metal body and away from the middle position.

14 Claims, 7 Drawing Sheets

ULTRA-WIDEBAND ANTENNA DEVICE

CROSS-REFERENCE TO RELATED APPLICATIONS

This application claims the priority benefit of Taiwan application serial No. 111128216, filed on Jul. 27, 2022. The entirety of the above-mentioned patent application is hereby incorporated by reference herein and made a part of the specification.

BACKGROUND OF THE DISCLOSURE

Field of the Invention

The disclosure relates to an ultra-wideband antenna device with a ground design.

Description of the Related Art

Electronic devices need to use antennas when transmitting or receiving radio frequency signals. The antennas can not only be used to transmit the radio frequency signals, but also be used to implement positioning functions. In the related art, the electronic devices use ultra-wideband (UWB) positioning technologies to realize indoor positioning. For an ultra-wideband antenna, a transmission distance of the ultra-wideband antenna is usually within 10 meters, and a bandwidth is above 1 GHz. An ultra-wideband is a carrier-free communication technology, which uses nanosecond (ns) to picosecond (ps) non-sinusoidal narrow pulses to transmit data, and these pulses occupy a wide bandwidth range.

However, with the development of communication technologies, there are increasing types of radio frequency signals that the electronic devices need to support, such as 4G, 5G, WiFi and other radio frequency signals. Therefore, more antennas need to be arranged inside the electronic devices, resulting in smaller space inside the electronic devices, which is insufficient for arrangement of the ultra-wideband antenna to realize positioning. Therefore, when the size of the ultra-wideband antenna is compressed in a small electronic device, transmission performance of the ultra-wideband antenna is severely affected, causing a negative impact on signal transmitting and receiving of the antenna.

BRIEF SUMMARY OF THE INVENTION

According to the first aspect of this disclosure, an ultra-wideband antenna device is provided. The ultra-wideband antenna device includes a radiation metal body, a first slotted hole, a second slotted hole, a third slotted hole, a fourth slotted hole, a ground point, and a feeding source. The radiation metal body includes a first side edge and a second side edge opposite to each other and a third side edge and a fourth side edge opposite to each other, the first slotted hole is located on the radiation metal body and extends inward from the first side edge, the second slotted hole is located on the radiation metal body and extends inward from the second side edge, the third slotted hole is located on the radiation metal body and extends inward from the third side edge, and the fourth slotted hole is located on the radiation metal body and extends inward from the fourth side edge. The ground point is located at a middle position of the radiation metal body, and the feeding source is located on the radiation metal body and away from the middle position.

According to the second aspect of this disclosure, an ultra-wideband antenna device is provided. The ultra-wideband antenna device includes: a dielectric substrate, three ultra-wideband antennas, and a ground plane. The dielectric substrate includes a first surface and a second surface. The three ultra-wideband antennas are arranged on the first surface of the dielectric substrate, and each ultra-wideband antenna includes a radiation metal body, a first slotted hole, a second slotted hole, a third slotted hole, a fourth slotted hole, a ground point, a feeding source, and a via. The radiation metal body includes a first side edge and a second side edge opposite to each other and a third side edge and a fourth side edge opposite to each other, the first slotted hole is located on the radiation metal body and extends inward from the first side edge, the second slotted hole is located on the radiation metal body and extends inward from the second side edge, the third slotted hole is located on the radiation metal body and extends inward from the third side edge, and the fourth slotted hole is located on the radiation metal body and extends inward from the fourth side edge. The ground point is located at the middle position of the radiation metal body, the feeding source is located on the radiation metal body and away from the middle position, and the via penetrates the dielectric substrate and is connected to the ground point. The ground plane is located on the second surface of the dielectric substrate, and the ground plane is electrically connected to the ground point by using the via.

In summary, the disclosure relates to an ultra-wideband antenna device, which implements the receiving and transmitting of radio frequency signals in two frequency bands by using a design of a smaller antenna size without increasing the antenna size and space, so that the ultra-wideband antenna device in the disclosure effectively improves antenna efficiency in limited space to maintain good wireless communication quality. Based on this, the disclosure still maintains good antenna performance while reducing the size of the ultra-wideband antenna device.

DETAILED DESCRIPTION OF THE EMBODIMENTS

Figure 1:
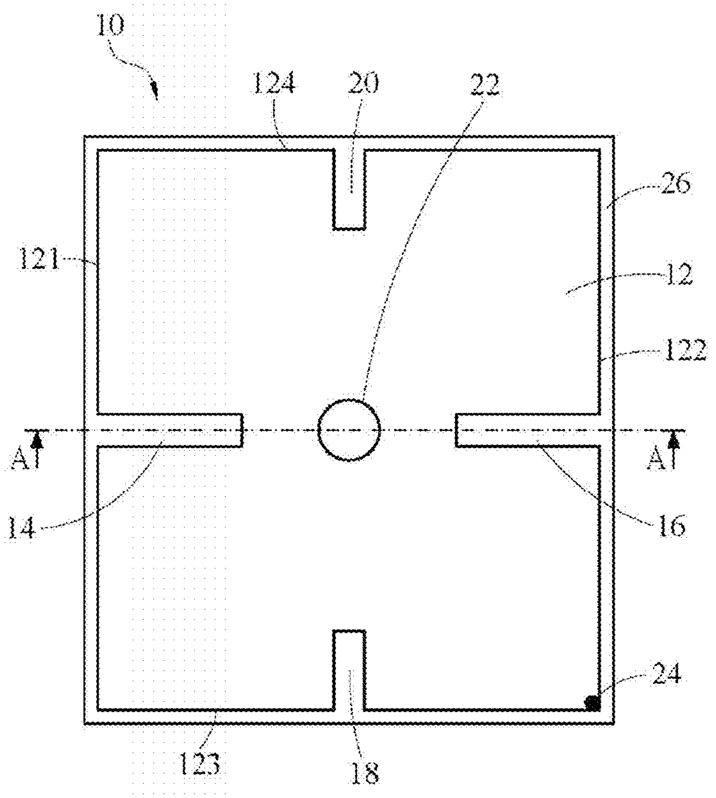
FIG. 1 is a schematic structural diagram of an ultra-wideband antenna device according to a first embodiment of the disclosure.

Embodiments of the disclosure are described below with reference to relevant drawings. The same reference numbers in the drawings represent the same or similar components or circuits. It should be understood that although terms such as "first", "second" in this specification may be used for describing various elements, components, areas, or functions, the elements, components, areas, or functions are not limited by such terms. The terms are only used to distinguish one element, component, area, or function from another element, component, area, or function.

FIG. 1 is a schematic structural diagram of an ultra-wideband antenna device according to a first embodiment of the disclosure. Referring to FIG. 1, in the first embodiment, an ultra-wideband antenna device 10 basically includes a radiation metal body 12, a first slotted hole 14, a second slotted hole 16, a third slotted hole 18, a fourth slotted hole 20, a ground point 22, and a feeding source 24.

In the ultra-wideband antenna device 10, the radiation metal body 12 includes a first side edge 121 and a second side edge 122 opposite to each other, and a third side edge 123 and a fourth side edge 124 opposite to each other. The third side edge 123 is adjacent to a same end of the first side edge 121 and the second side edge 122, and the fourth side edge 124 is adjacent to the other end of the first side edge 121 and the second side edge 122. The first slotted hole 14 is located on the radiation metal body 12 and extends vertically inward from the first side edge 121, so that the first slotted hole 14 formed on the radiation metal body 12 is closed at one end and open at the other end. The second slotted hole 16 is located on the radiation metal body 12 and extends vertically inward from the second side edge 122, so that the second slotted hole 16 formed on the radiation metal body 12 is closed at one end and open at the other end. The third slotted hole 18 is located on the radiation metal body 12 and extends vertically inward from the third side edge 123, so that the third slotted hole 18 formed on the radiation metal body 12 is closed at one end and open at the other end. The fourth slotted hole 20 is located on the radiation metal body 12 and extends vertically inward from the fourth side 124, so that the fourth slotted hole 20 formed on the radiation metal body 12 is closed at one end and open at the other end. The ground point 22 is located at a middle position of the radiation metal body 12. In an embodiment, the middle position of the ground point 22 is a geometric center of the radiation metal body 12 to connect a position with a strongest current to ground. The feeding source 24 is located on the radiation metal body 12 and away from the middle position, so that the feeding source 24 is arranged at an edge corner of the radiation metal body 12 to receive or transmit a radio frequency signal by using the feeding source 24. In this embodiment, the feeding source 24 is at a lower right corner, but the disclosure is not limited thereto.

In an embodiment, the first slotted hole 14 and the second slotted hole 16 have a same first length, and the first slotted hole 14 and the second slotted hole 16 are located on a same horizontal line. The third slotted hole 18 and the fourth slotted hole 20 have a same second length, and the third slotted hole 18 and the fourth slotted hole 20 are located on a same vertical line. The first length is different from the second length. The first slotted hole 14 and the second slotted hole 16 having the first length are used to implement resonance of a first frequency band, so that the ultra-wideband antenna device 10 supports reception and transmission of a radio frequency signal in the first frequency band. The third slotted hole 18 and the fourth slotted hole 20 having the second length are used to implement resonance of a second frequency band, so that the ultra-wideband antenna device 10 supports reception and transmission of a radio frequency signal in the second frequency band. In this embodiment, the first length is greater than the second length, so the first slotted hole 14 and the second slotted hole 16 having the first length are used to implement the resonance of the lower first frequency band, while the third slotted hole 18 and the fourth slotted hole 20 having the second length are used to implement the resonance of the higher second frequency band.

Figure 2:
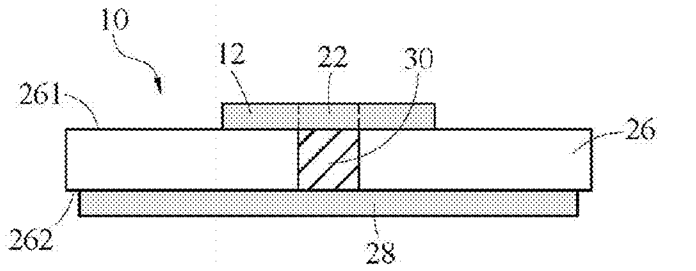
FIG. 2 is a structural cross-sectional view of the ultra-wideband antenna device taken along line segment AA according to FIG. 1.

Referring to FIG. 1 and FIG. 2 together, the ultra-wideband antenna device 10 further includes a dielectric substrate 26, a ground plane 28, and a via 30. The dielectric substrate 26 includes a first surface 261 and a second surface 262 opposite to each other. The radiation metal body 12 is arranged on the first surface 261 of the dielectric substrate 26. The ground plane 28 is located on the second surface 262 of the dielectric substrate 26. The via 30 penetrates the dielectric substrate 26 to electrically connect the ground point 22 and the ground plane 28, so that the ground point 22 of the radiation metal body 12 is electrically connected and grounded to the ground plane 28 through the via 30.

Figure 3:
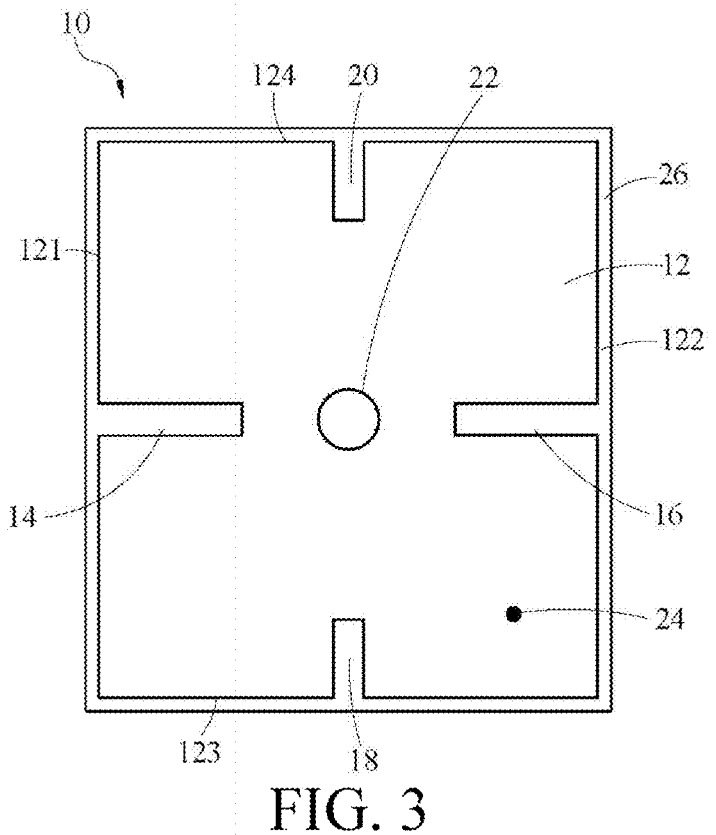
FIG. 3 is a schematic structural diagram of an ultra-wideband antenna device according to a second embodiment of the disclosure.

FIG. 3 is a schematic structural diagram of an ultra-wideband antenna device according to a second embodiment of the disclosure. Referring to FIG. 2 and FIG. 3 together, in the second embodiment, the ultra-wideband antenna device 10 further includes a radiation metal body 12, a first slotted hole 14, a second slotted hole 16, a third slotted hole 18, a fourth slotted hole 20, a ground point 22, a feeding source 24, a dielectric substrate 26, a ground plane 28, and a via 30. The feeding source 24 is arranged on the radiation metal body 12 and away from a middle position, so that the feeding source 24 is arranged at a position of the radiation metal body 12 surrounded by the second slotted hole 16 and the third slotted hole 18, so as to receive or transmit a radio frequency signal through the feeding source 24. Based on this, the position of the feeding source 24 is changed to improve antenna performance in the disclosure. In this embodiment, the feeding source 24 is at a position of the radiation metal body 12 surrounded by the second slotted hole 16 and the third slotted hole 18, but the disclosure is not limited thereto. In the second embodiment, other components are the same as in the first embodiment except the position of the feeding source 24. Therefore, reference is made to the foregoing description, and the disclosure is not described herein again.

Figure 4:
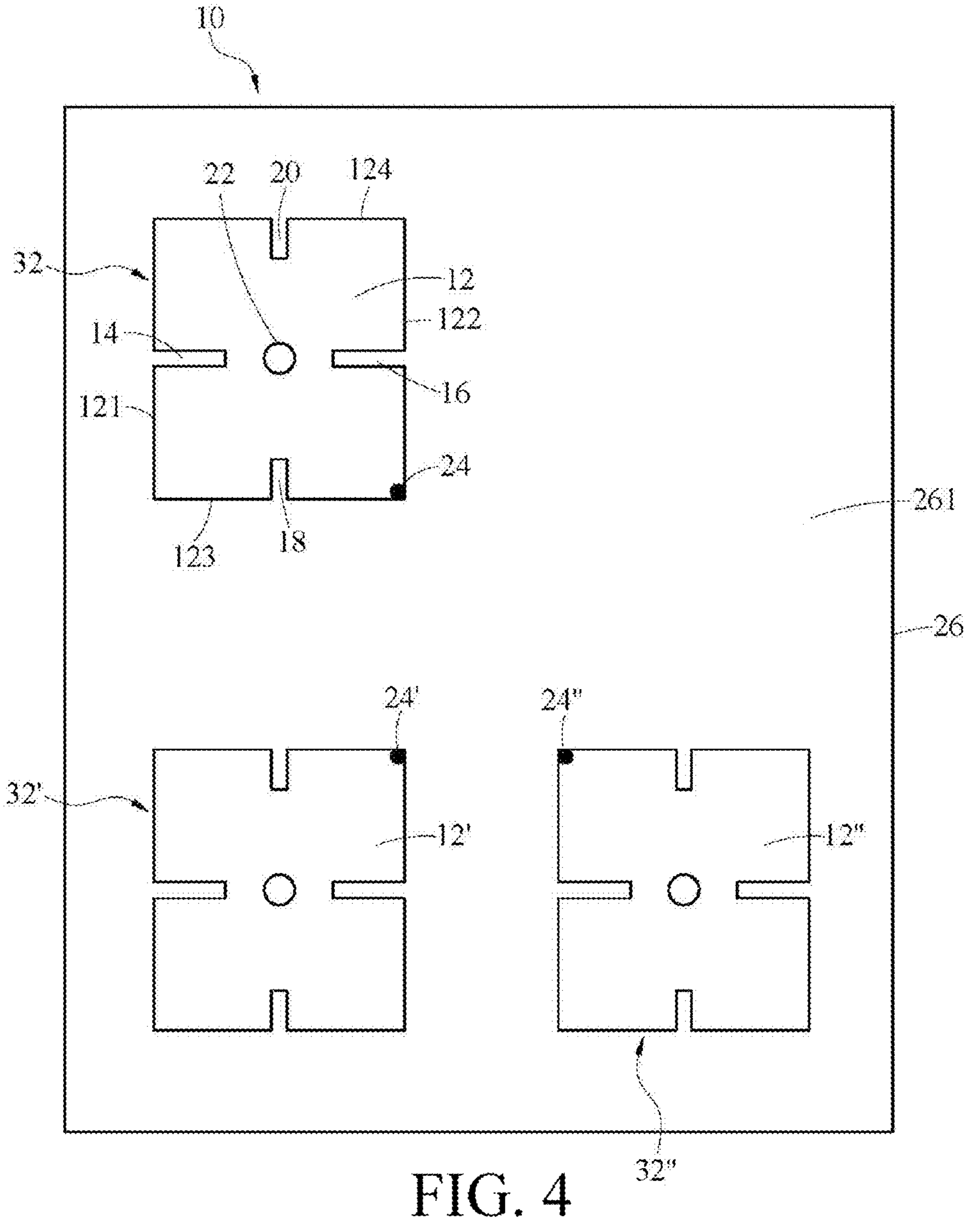
FIG. 4 is a schematic structural diagram of an ultra-wideband antenna device according to another embodiment of the disclosure.
Figure 5:
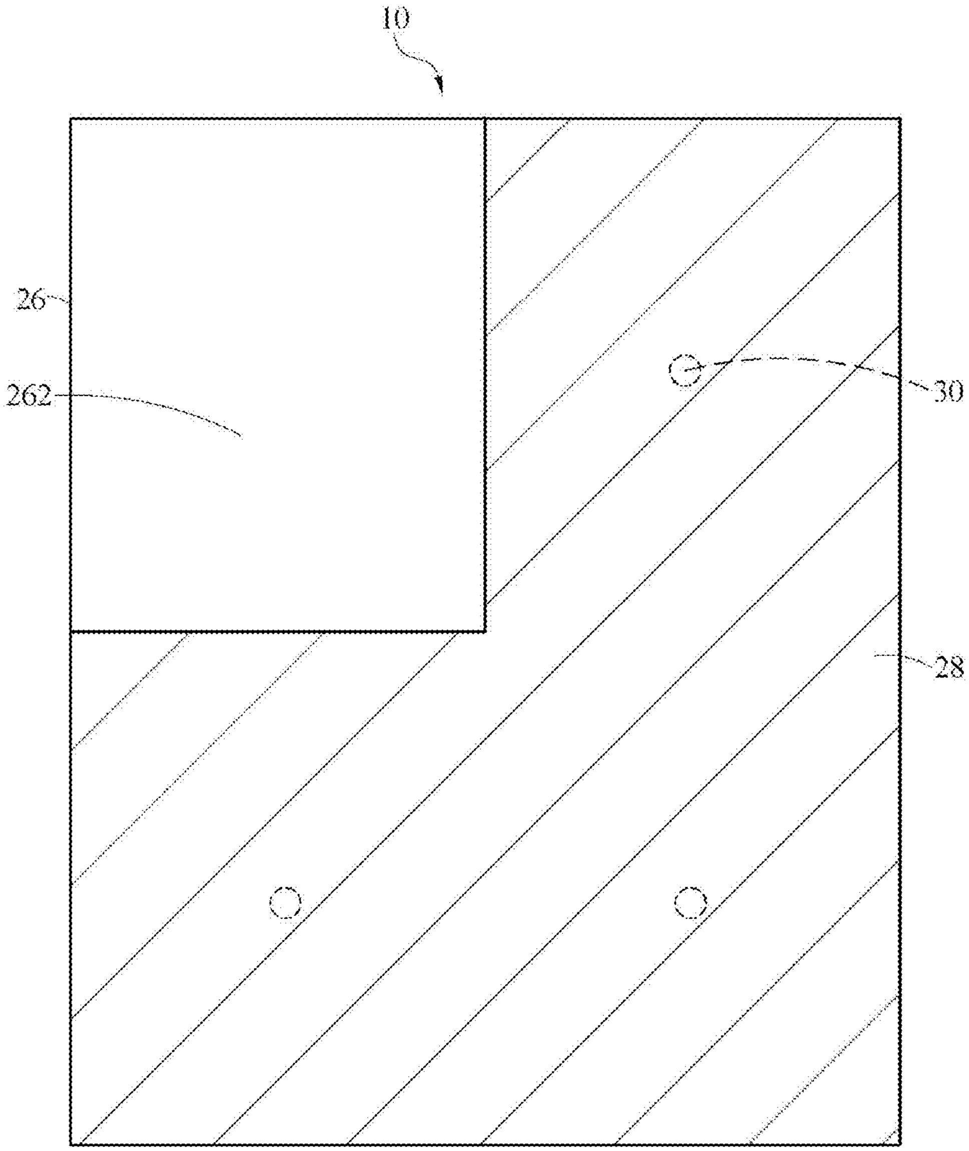
FIG. 5 is a schematic structural diagram of a bottom surface of an ultra-wideband antenna device according to FIG. 4.

In an embodiment, the ultra-wideband antenna device 10 further includes a plurality of ultra-wideband antennas 32, 32', 32". Referring to FIG. 4 and FIG. 5 together, an ultra-wideband antenna device 10 includes a dielectric substrate 26, three ultra-wideband antennas 32, 32', 32", and a ground plane 28. The dielectric substrate 26 includes a first surface 261 and a second surface 262. The three ultra-wideband antennas 32, 32', 32" are arranged on the first surface 261 of the dielectric substrate 26 and arranged in an L-shape. Each ultra-wideband antenna 32, 32', 32" has a same structural design. In an embodiment, the ultra-wideband antenna 32 includes a radiation metal body 12, a first slotted hole 14, a second slotted hole 16, a third slotted hole 18, a fourth slotted hole 20, a ground point 22, a feeding source 24, and a via 30. The radiation metal body 12 includes a first side edge 121 and a second side edge 122 opposite to each other and a third side edge 123 and a fourth side edge 124 opposite to each other. The first slotted hole 14 is located on the radiation metal body 12 and extends inward from the first side edge 121, the second slotted hole 16 is located on the radiation metal body 12 and extends inward from the second side edge 122, the third slotted hole 18 is located on the radiation metal body 12 and extends inward from the third side edge 123, and the fourth slotted hole 20 is located on the radiation metal body 12 and extends inward from the fourth side edge 124. The ground point 22 is located in a middle position of the radiation metal body 12, and the feeding source 24 is located on the radiation metal body 12 and away from the middle position. The via 30 penetrates the dielectric substrate 26 and is connected to the ground point 22. The ground plane 28 is located on the second surface 262 of the dielectric substrate 26, and the ground plane 28 is connected to the ground point 22 through the via 30, so that the ground point 22 is electrically connected and grounded to the ground plane 28 through the via 30. The feeding source 24, 24', 24" of each ultra-wideband antenna 32, 32', 32" is located at a different position. The feeding source 24, 24', 24" of each ultra-wideband antenna 32, 32', 32" is located at an edge corner close of the radiation metal bodies 12, 12', 12" close the other ultra-wideband antennas 32, 32', 32". More specifically, the feeding source 24 of the ultra-wideband antenna 32 is located at an edge corner of the radiation metal bodies 12 close to the other ultra-wideband antennas 32', 32", that is, the feeding source 24 of the ultra-wideband antenna 32 is arranged at an edge corner of the lower right corner of the radiation metal body 12. The feeding source 24' of the ultra-wideband antenna 32' is located at an edge corner of the radiation metal body 12' close to the other ultra-wideband antennas 32, 32', that is, the feeding source 24' of the ultra-wideband antenna 32' is arranged at an edge corner of an upper right corner of the radiation metal body 12'. The feeding source 24" of the ultra-wideband antenna 32" is located at an edge corner position of the radiation metal body 12" close the other ultra-wideband antennas 32, 32', that is, the feeding source 24" of the ultra-wideband antenna 32" is located at an edge corner of an upper left corner of the radiation metal body 12".

In an embodiment, as shown in FIG. 1 to FIG. 5, the dielectric substrate 26 is a printed circuit board or a plastic substrate, but the disclosure is not limited thereto. It is feasible to use any carrier on which the radiation metal body 12, the via 30, and the ground plane 28 as the dielectric substrate 26 of the disclosure.

In an embodiment, as shown in FIG. 1 to FIG. 5, the radiation metal body 12 and the ground plane 28 are respectively formed on the first surface 261 and the second surface 262 of the dielectric substrate 26 by printing. In an embodiment, the dielectric substrate 26, and the radiation metal body 12 and the ground plane 28 on the dielectric substrate 26 are printed circuit boards (PCB) having antenna patterns printed thereon.

In an embodiment, as shown in FIG. 1 to FIG. 5, the radiation metal body 12 and the ground plane 28 are made of conductive materials, such as silver, copper, iron, aluminum, or alloys thereof, but the disclosure is not limited thereto.

In an embodiment, the ground plane 28 is an independent metal sheet or metal layer, or located on a metal plane of an electronic device. In an embodiment, the ground plane 28 is a metal frame of an electronic device or a metal sheet or a sputtered metal portion inside a housing of an electronic device, but the disclosure is not limited thereto. In an embodiment, when the electronic device is a notebook computer, the ground plane 28 is a system ground plane of a screen of the notebook computer or a metal portion such as an EMI aluminum foil or a sputtered metal region inside a housing of the screen of the notebook computer.

Figure 6:
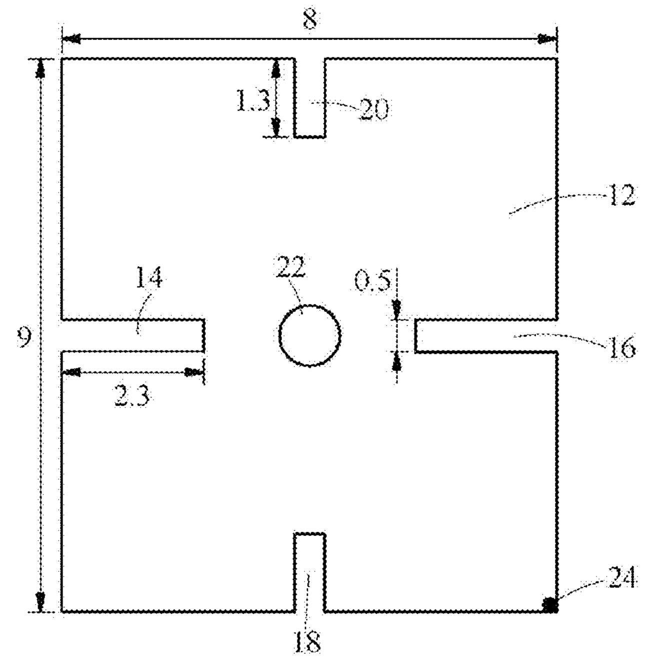
FIG. 6 is a schematic structural diagram of a size of a radiation metal body used in an ultra-wideband antenna device according to a first embodiment of the disclosure.
Figure 7:
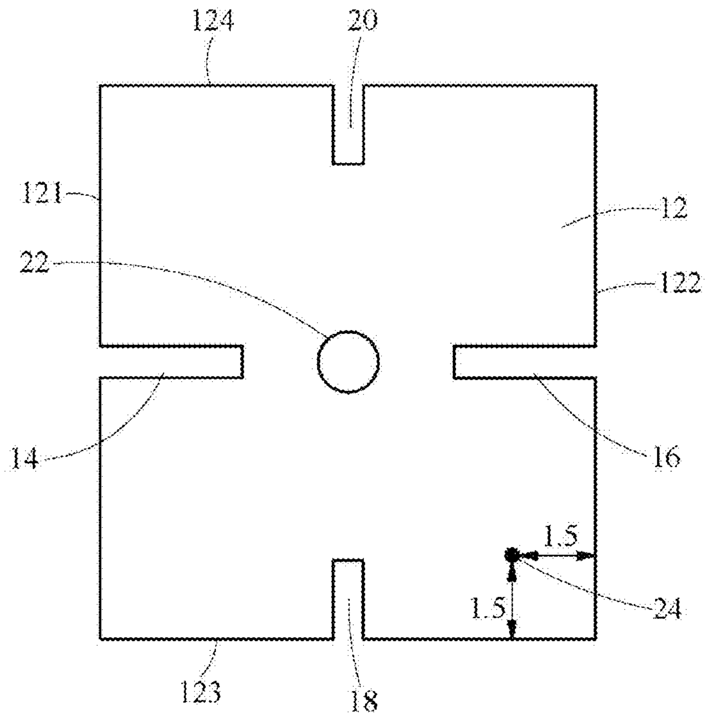
FIG. 7 is a schematic structural diagram of a size of a radiation metal body used in an ultra-wideband antenna device according to a second embodiment of the disclosure.

In an embodiment, as shown in FIG. 6, in the radiation metal body 12 used in the ultra-wideband antenna device 10 in the first embodiment, the radiation metal body 12 has a length of 9 mm and a width of 8 mm. The first slotted hole 14 and the second slotted hole 16 have a width of 0.5 mm, and a length of 2.3 mm. The third slotted hole 18 and the fourth slotted hole 20 have a width of 0.5 mm and a length of 1.3 mm. The first length of the first slotted hole 14 and the second slotted hole 16 is greater than the second length of the third slotted hole 18 and the fourth slotted hole 20. As shown in FIG. 7, a size of the radiation metal body 12 used in the ultra-wideband antenna device 10 in the second embodiment is the same as that in the first embodiment shown in FIG. 4, except that the feeding source 24 is located at a distance of 1.5 mm from the second side edge 122 and at a distance of 1.5 mm from the third side edge 123. In the disclosure, simulation experiments are performed on the ultra-wideband antenna device 10 including the radiation metal body 12 in the first embodiment of FIG. 6 and the ultra-wideband antenna device 10 including the radiation metal body 12 in the second embodiment of FIG. 7.

Figure 8:
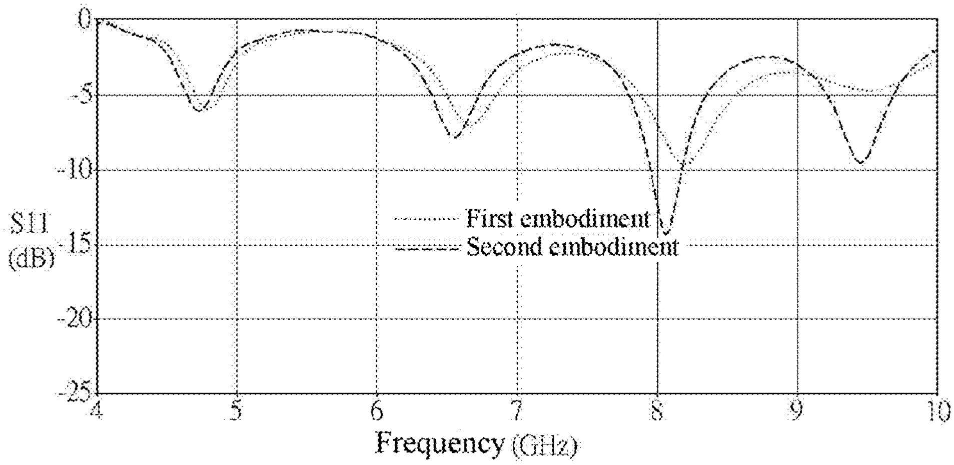
FIG. 8 is a schematic simulation diagram of parameter S generated by an ultra-wideband antenna device in different frequencies according to the disclosure.
Figure 9:
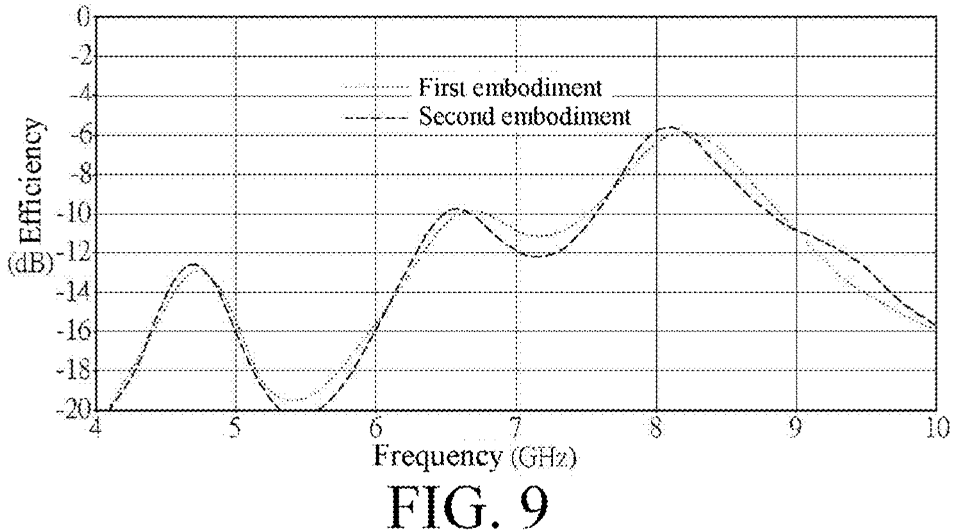
FIG. 9 is a schematic simulation diagram of radiation efficiency of an ultra-wideband antenna device under different frequencies according to the disclosure.

Referring to FIG. 1, FIG. 3, FIG. 8 and FIG. 9 together, simulation of parameter S (S11) and antenna efficiency is carried out by using the ultra-wideband antenna device 10 including the radiation metal body 12 in the first embodiment of FIG. 6 and the ultra-wideband antenna device 10 including the radiation metal body 12 in the second embodiment of FIG. 7. When the antenna device 10 is in a 6.5 GHz operating band and an 8 GHz operating band, a simulation result of parameter S of the antenna device 10 is shown in FIG. 8. From the curves shown in the diagram, it can be seen that reflection coefficients (S11) of low frequency band (6.5 GHz, a first frequency band) and high frequency band (8 GHz, a second frequency band) resonance modes shown in the diagram are both less than −5 dB (S11<−5 dB), indicating that the ultra-wideband antenna device 10 in the first embodiment and the ultra-wideband antenna device 10 in the second embodiment have good reflection coefficients in both the first frequency band and the second frequency band. On the other hand, as shown in FIG. 9, under different operating frequency bands, antenna efficiency of the ultra-wideband antenna device 10 in the first embodiment is equivalent to antenna efficiency of the ultra-wideband antenna device 10 in the second embodiment, indicating that the ultra-wideband antenna device 10 also has good antenna radiation efficiency.

Figure 10:
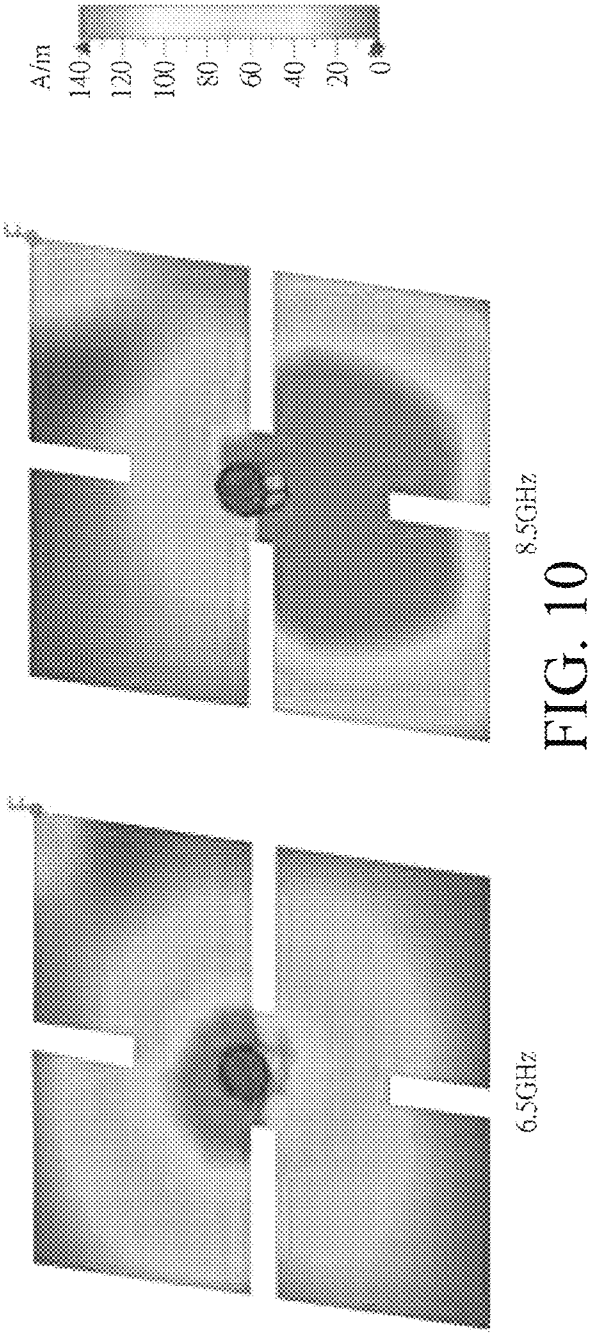
FIG. 10 is a diagram of current distribution of an ultra-wideband antenna device operating in frequency bands of 6.5 GHz and 8.5 GHz according to the disclosure.

Referring to FIG. 1 and FIG. 6 together, in an embodiment, current distribution of the ultra-wideband antenna device 10 including the radiation metal body 12 in the first embodiment of FIG. 6 is simulated. FIG. 10 is a diagram of current distribution of an ultra-wideband antenna device operating in frequency bands of 6.5 GHz and 8.5 GHz according to the disclosure. As shown in FIG. 10, a current under 6.5 GHz is mainly distributed in the first slotted hole 14 and the second slotted hole 16, and a current under 8.5 GHz is mainly distributed in the third slotted hole 18 and the fourth slotted hole 20. Therefore, the disclosure maintains good antenna performance while maintaining the size of the ultra-wideband antenna device 10.

In summary, the disclosure relates to an ultra-wideband antenna device, which implements the receiving and transmitting of radio frequency signals in two frequency bands by using a design of a smaller antenna size without increasing the antenna size and space, so that the ultra-wideband antenna device in the disclosure effectively improves the antenna efficiency in limited space to maintain good wireless communication quality. Based on this, the disclosure still maintains good antenna performance in a case that a size of the ultra-wideband antenna device is reduced.

The foregoing embodiments are merely for describing the technical ideas and the characteristics of the disclosure, and are intended to enable those skilled in the art to understand and hereby implement the content of the disclosure. However, the scope of claims of the disclosure is not limited thereto. In other words, equivalent changes or modifications made according to the spirit disclosed in the disclosure shall still fall into scope of the claims of the disclosure.

What is claimed is:

1. An ultra-wideband antenna device, comprising:

a radiation metal body, comprising a first side edge and a second side edge opposite to each other and a third side edge and a fourth side edge opposite to each other;

a first slotted hole, located on the radiation metal body and extending inward from the first side edge;

a second slotted hole, located on the radiation metal body and extending inward from the second side edge;

a third slotted hole, located on the radiation metal body and extending inward from the third side edge;

a fourth slotted hole, located on the radiation metal body and extending inward from the fourth side edge;

a ground point, located at a middle position of the radiation metal body; and a feeding source, located on the radiation metal body and away from the middle position.

2. The ultra-wideband antenna device according to claim 1, wherein the first slotted hole and the second slotted hole have a same first length, the third slotted hole and the fourth slotted hole have a same second length, and the first length is different from the second length.

3. The ultra-wideband antenna device according to claim 2, wherein the first slotted hole and the second slotted hole are located on a same horizontal line, and the third slotted hole and the fourth slotted hole are located on a same vertical line.

4. The ultra-wideband antenna device according to claim 3, wherein the first length is greater than the second length.

5. The ultra-wideband antenna device according to claim 1, wherein the middle position of the ground point is a geometric center of the radiation metal body.

6. The ultra-wideband antenna device according to claim 1, further comprising a dielectric substrate, wherein the dielectric substrate comprises a first surface and a second surface, and the radiation metal body is arranged on the first surface of the dielectric substrate.

7. The ultra-wideband antenna device according to claim 6, further comprising:

a ground plane, located on the second surface of the dielectric substrate; and a via, penetrating the dielectric substrate to electrically connect the ground point and the ground plane.

8. The ultra-wideband antenna device according to claim 1, wherein the feeding source is located at an edge corner of the radiation metal body.

9. An ultra-wideband antenna device, comprising:

a dielectric substrate, comprising a first surface and a second surface;

three ultra-wideband antennas, arranged on the first surface of the dielectric substrate, and each of the ultra-wideband antennas comprises:

a radiation metal body, comprising a first side edge and a second side edge opposite to each other and a third side edge and a fourth side edge opposite to each other;

a first slotted hole, located on the radiation metal body and extending inward from the first side edge;

a second slotted hole, located on the radiation metal body and extending inward from the second side edge;

a third slotted hole, located on the radiation metal body and extending inward from the third side edge;

a fourth slotted hole, located on the radiation metal body and extending inward from the fourth side edge;

a ground point, located at a middle position of the radiation metal body;

a feeding source, located on the radiation metal body and away from the middle position; and a via, wherein the via penetrates the dielectric substrate and is connected to the ground point; and a ground plane, located on the second surface, wherein the ground plane is electrically connected to the ground point through the via.

10. The ultra-wideband antenna device according to claim 9, wherein the feeding source of each ultra-wideband antenna is located at an edge corner of the radiation metal body close to the other ultra-wideband antennas.

11. The ultra-wideband antenna device according to claim 9, wherein the first slotted hole and the second slotted hole have a same first length, the third slotted hole and the fourth slotted hole have a same second length, and the first length is different from the second length.

12. The ultra-wideband antenna device according to claim 11, wherein the first slotted hole and the second slotted hole are located on a same horizontal line, and the third slotted hole and the fourth slotted hole are located on a same vertical line.

13. The ultra-wideband antenna device according to claim 12, wherein the first length is greater than the second length.

14. The ultra-wideband antenna device according to claim 9, wherein the middle position of the ground point is a geometric center of the radiation metal body.

* * * * *